(12) United States Patent
Eberspach

(10) Patent No.: US 7,771,678 B2
(45) Date of Patent: Aug. 10, 2010

(54) CATALYTIC CONVERTER ELEMENT

(75) Inventor: Guenter Eberspach, Wolfschlugen (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 424 days.

(21) Appl. No.: 11/805,335

(22) Filed: May 22, 2007

(65) Prior Publication Data
US 2007/0274883 A1   Nov. 29, 2007

(30) Foreign Application Priority Data
May 24, 2006   (DE) .................. 10 2006 024 862

(51) Int. Cl.
*B01J 8/02* (2006.01)
(52) U.S. Cl. .................. 422/222; 502/439; 502/527.18; 502/527.19; 502/527.21
(58) Field of Classification Search ........... 422/222; 502/439, 527.18–527.21
See application file for complete search history.

(56) References Cited

U.S. PATENT DOCUMENTS

2005/0180898 A1*   8/2005   Yamada .................. 422/180

FOREIGN PATENT DOCUMENTS

| DE | 88 16 500 | 11/1989 |
|---|---|---|
| DE | 198 58 974 | 6/2000 |
| DE | 199 07 666.9 | 8/2000 |
| WO | WO 03/084640 | * 10/2003 |

* cited by examiner

*Primary Examiner*—Robert J Hill, Jr.
*Assistant Examiner*—Brian McCaig
(74) *Attorney, Agent, or Firm*—Howard IP Law Group, PC

(57) ABSTRACT

The present invention relates to a catalytic converter element having a plurality of essentially parallel channels through which gas flows during operation of the catalytic converter element. The channels are bordered by channel walls which have a catalytically active coating arranged thereon in at least some areas where it is exposed to the gas. In some channels the coating thus begins with an axial offset from the admission end. This allows an improved temperature management within the catalytic converter element.

10 Claims, 2 Drawing Sheets

CATALYTIC CONVERTER ELEMENT

FIELD OF THE INVENTION

The present invention relates to a catalytic converter element having a plurality of essentially parallel channels through which gas flows during operation of the catalytic converter element.

BACKGROUND OF THE INVENTION

In a fuel cell system, a combustible gas or synthesis gas containing hydrogen is generated by partial oxidation in a reformer, and this gas is then supplied to the anode of a fuel cell for conversion to electricity. The gases entering the catalytic converter in the reformer in partial catalytic oxidation include essentially hydrocarbons, air, water vapor, carbon monoxide and carbon dioxide. To avoid unnecessary monitoring of the incoming gas with regard to its composition, i.e., to be able to operate the process in the broadest possible lambda window, the anode exhaust gas of the fuel cell or the exhaust of one of the residual gas burners downstream from the fuel cell may be recycled to combine the anode gas and the cathode gas. This increases the water content in the gas, which contributes toward preventing the formation of soot.

In principle, a catalytic converter element operates at very high temperatures, often near the decomposition limit of the support material forming the catalytic converter element and the coating arranged thereon. On admission of the gas mixture consisting of the aforementioned components, an exothermic oxidation reaction takes place in the first few millimeters of the substrate, i.e., the support material, which has been coated with a catalytically active coating, the so-called "wash coat"; in this reaction, the hydrocarbons react with the oxygen to form carbon dioxide and water. In the remaining course, i.e., as the gas continues to flow through the catalytic converter element, an endothermic steam reforming process takes place, in which carbon dioxide and hydrogen are formed from carbon monoxide and water vapor. The highly exothermic reaction at the point of admission of the catalytic converter element, however, reduces the lifetime of the catalytic converter element and in particular the coating because the dissipation of heat toward the outside is very minimal at the center of the catalytic converter element, for example, and therefore the high temperatures that occur due to the exothermic reaction can in the long run have an effect on the coating, i.e., the wash coat.

SUMMARY OF THE INVENTION

The present invention relates to the problem of finding a method for a catalytic converter element that will allow a longer lifetime of the catalytic converter element in particular.

The invention is based on the general idea of providing the substrate, i.e., the support material forming the channel walls with a catalytically active coating, but not completely and uniformly, and instead having it begin with an axial offset at the admission end when there are a few channels running essentially in parallel through the catalytic converter element. This means that in the first few millimeters, some of the channels have the catalytically active coating while some of the other channels do not have this coating. In the channels in which the coating begins at the start of the channel, the heat released by the exothermic oxidation reaction can be transferred through the channel wall to the gas stream of a neighboring channel, whereby the gas flowing there will be much colder than the gas heated by the exothermic oxidation reaction. The heat released in the oxidation reaction can support a shift reaction in the channels with the coating which begins immediately at the admission to the channels with the axially offset coating. This makes it possible to prevent overheating of the catalytic converter element at the admission as well as excessive cooling at the channel ends combined with increased emissions due to unconverted hydrocarbons.

A plurality of channels is expediently combined to form channel elements, in particular monolithic channel elements. Such monolithic channel elements can be manufactured much more economically and thus less expensively in comparison with individual channels, whereby the effect described in the general idea of the present invention is comparable inasmuch as a plurality of such channel elements are joined together in the case of a worked catalytic converter element and whereby some of the channel elements have the coating beginning at the admission end, while others, preferably the neighboring channel elements, have a coating that is offset axially in the direction of flow.

In an exemplary embodiment, the channels that are combined to form one channel element have a coating that begins at the same axial position. This allows an economical and thus inexpensive production of the channel elements because the channels combined to form the channel elements all have a similar design.

The channel walls are expediently formed by a substrate of silicon carbide. Silicon carbide has a high thermal conductivity and therefore ensures a good transfer of heat at the admission end of the catalytic converter element from channels with coatings beginning directly at the admission end to surrounding channels where the catalytically active coating begins only with an axial offset in the direction of flow.

It is self-evident that the features mentioned above and those yet to be explained below may be used not only in the particular combination given but also in other combinations or alone without going beyond the scope of the invention.

Exemplary embodiments of the invention are illustrated in the drawings and explained in greater detail in the following description, where the same reference numerals refer to the same or similar or functionally similar components.

BRIEF DESCRIPTION OF THE DRAWINGS

The schematic diagram in.

DETAILED DESCRIPTION OF THE INVENTION

Figure 1:
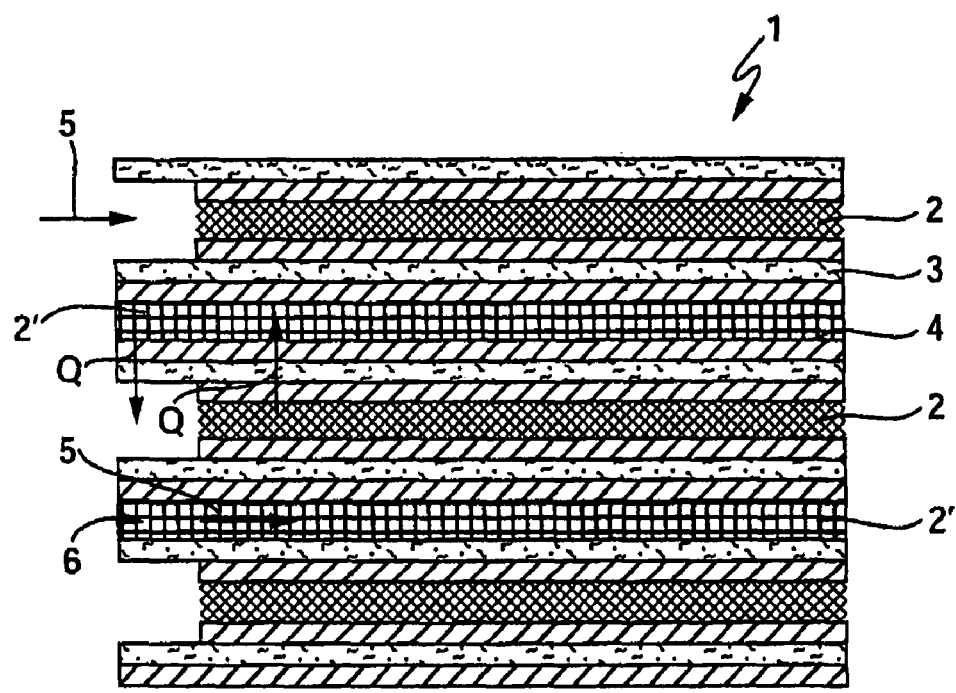
FIG. 1 shows a longitudinal section through an inventive catalytic converter element having a plurality of channels.

According to FIG. 1, a catalytic converter element 1 has essentially a plurality of channels 2 which run parallel to one another and through which gas flows during operation of the catalytic converter element 1. The gas flowing through the catalytic converter element 1 may be a mixture of hydrocarbon, air, water vapor, carbon monoxide and carbon dioxide. In order for the widest possible range of gas mixtures to be processable by the catalytic converter element 1, i.e., in order for the catalytic oxidation process to be operable in the widest possible lambda window, an anode exhaust gas or an exhaust gas from a residual gas burner is additionally supplied to the gas mixture, thus increasing the water content in the gas mixture and thereby at least reducing the formation of soot.

The channels 2 running through the catalytic converter element 1 are bordered by channel walls 3 according to FIG. 1, having a catalytically active coating 4 that is arranged on the channel walls in at least some areas and is exposed to the gas. During operation of the catalytic converter element 1, it operates at very high temperatures close to the limit of destruction of the channel walls 3, which are formed from a substrate, e.g., made of silicon carbide, and the catalytically active coating 4. The extremely high temperatures come about due to a highly exothermic oxidation reaction in which hydrocarbons react with oxygen to form carbon dioxide and water. This highly exothermic oxidation reaction takes place in the first millimeters of the channels 2, whereby this oxidation reaction takes place only inasmuch as the channels 2 have a catalytically active coating 4. Further downstream from the admission end 6, i.e., in the direction of flow 5, an endothermic steam reforming process takes place in which carbon dioxide and hydrogen are formed from carbon monoxide and water vapor. However, the highly exothermic reaction at the admission end 6 of the channels 2 in particular threatens the lifetime of the catalytic converter element 1 and the coating 4 because the required dissipation of heat to the outside, in particular at the center of the catalytic converter element 1, does not occur.

With the inventive catalytic converter element 1, the catalytically active coating 4 with some channels 2 therefore begins with an axial offset in the direction of flow 5 with respect to the admission end 6. As a result, the heat Q released by the exothermic oxidation reaction can be transferred through the channel wall 3 into the gas stream of the neighboring channels 2'. The gas flowing there is definitely cooler (approximately 500° C.) so that the heat Q released in the oxidation reaction can support the shift reaction in the channels 2 with an axially offset coating 4. The term "shift reaction" used here is understood to refer to the conversion of carbon monoxide and water to carbon dioxide and hydrogen. This thus corresponds to the steam reforming mentioned above. Due to the fact that coating 4 is partially offset axially in some channels 2, overheating of the catalytic converter element 1 at the admission end 6 due to the highly exothermic oxidation reaction can be prevented on the one hand, while on the other hand, excessive cooling at one channel end, which is associated with increased emissions of unconverted hydrocarbons, can also be prevented.

Figure 2:
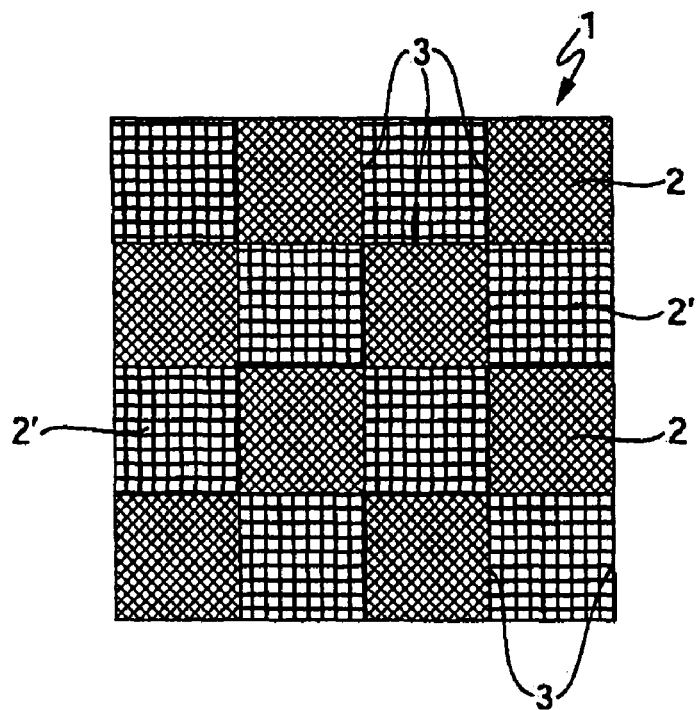
FIG. 2 shows a cross section through a catalytic converter element in the area of its admission end.
Figure 3:
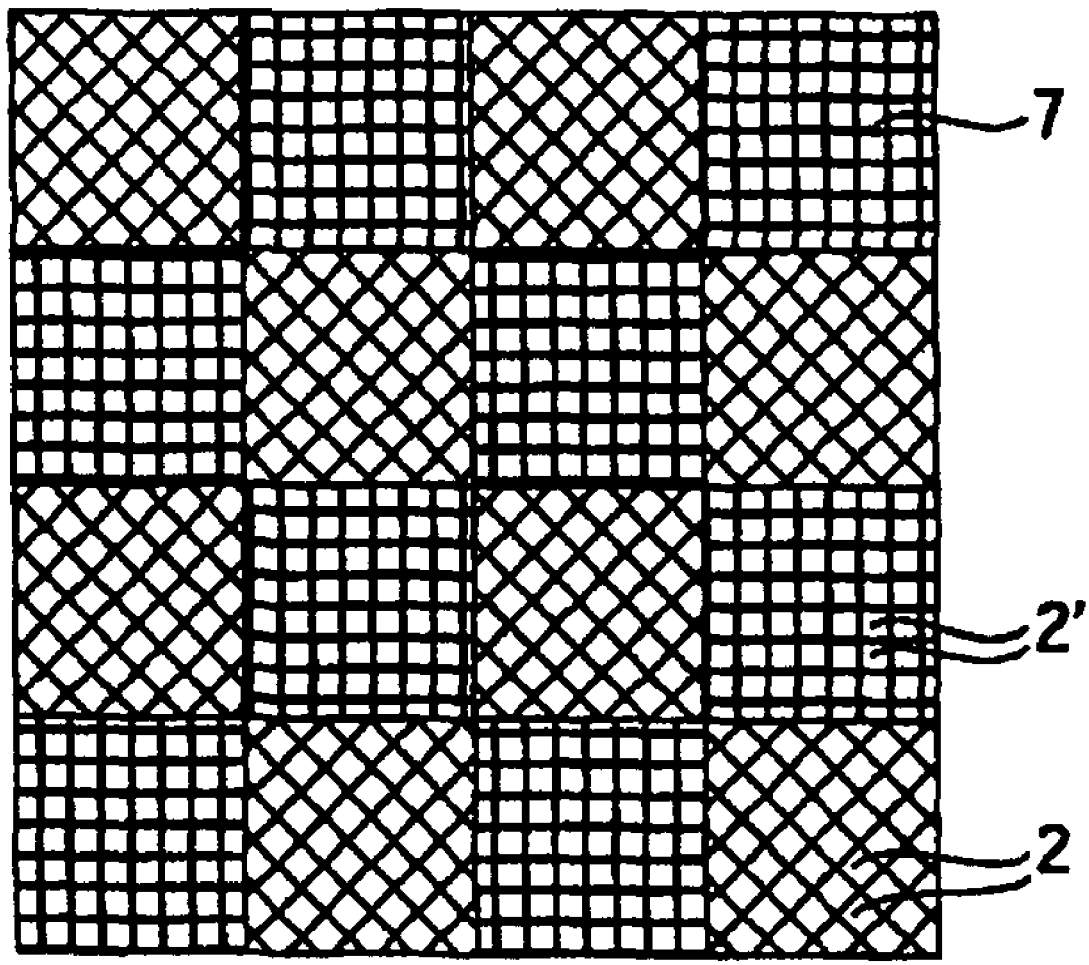
FIG. 3 shows a diagram like that in FIG. 2, but with a plurality of channel elements, each comprising a plurality of parallel channels.

According to FIG. 2, channels 2 with an axially offset coating 4 and channels 2' with a coating 4 beginning directly at the admission end 6 may be arranged adjacent to one another, e.g., in a checkerboard pattern. It is also conceivable for multiple channels 2 or 2' to be combined to form channel elements 7, in particular monolithic channel elements, where the channels 2 or 2' that are combined to form a channel element 7 each have a coating 4 beginning at the same axial position.

The catalytically active coating 4 is applied to the channel wall 3, which is formed by a substrate of silicon carbide, for example.

Use of the inventive catalytic converter element 1 in a reformer, for example, is conceivable, where the reformer generates a combustible gas containing hydrogen from a hydrocarbon fuel and an oxidizer containing oxygen. In such a reformer, either a single catalytic converter element 1 or a plurality of catalytic converter elements 1 may be used.

Thus, there is presented a catalytic converter element 1 having a plurality of essentially parallel channels 2, 2', where a catalytically active coating 4 arranged on the channel walls 3 is arranged in some channels 2 so that it is offset axially from the admission end 6 in the direction of flow, so that the highly exothermic oxidation reaction induced by the coating begins only at a later point in time in these channels. The coating 4, which begins at the admission end 6 in the channels 2', causes the immediate exothermic oxidation reaction, so that the heat Q generated thereby can flow into the neighboring channels 2 in which the coating 4 begins only farther downstream. In this way, overheating of the catalytic converter element 1 on the one hand is prevented so that its long life is promoted, and on the other hand, the heat Q released in the oxidation reaction in the neighboring channels 2' with the axially offset coating 4 can thereby support the endothermic reaction. Furthermore, excessive cooling at the end of the channel combined with increased emissions of unconverted hydrocarbons can be prevented or at least reduced.

The invention claimed is:

1. A catalytic converter element comprising:
a plurality of essentially parallel channels through which gas flows during operation of the catalytic converter element, wherein each of said plurality of channels through which gas flows during operation of the catalytic converter element has an open inlet end and an open outlet end;
wherein the channels are bordered by channel walls which have a catalytically active coating that is arranged on the channel walls in at least some areas and is exposed to the gas, wherein the coating on the channel walls begins with an axial offset in the direction of flow at the admission end of some channels.

2. The catalytic converter element according to claim 1, wherein a plurality of channels are combined to form channel elements.

3. The catalytic converter element according to claim 2, wherein the channels that are combined into one channel element have a coating that begins at the same axial position.

4. The catalytic converter element according to claim 2, wherein neighboring channel elements each have a different alternating axial position positions at which the coating begins, as seen in the direction of flow.

5. The catalytic converter element according to claim 1, wherein the channel walls comprise silicon carbide (SiC).

6. A reformer for generating a combustible gas containing hydrogen from a hydrocarbon fuel and an oxidizer containing oxygen with at least one catalytic converter element, said reformer comprising:
a plurality of essentially parallel channels through which gas flows during operation of the catalytic converter element, wherein each of said plurality of channels through which gas flows during operation of the catalytic converter element has an open inlet end and an open outlet end;
wherein the channels are bordered by channel walls which have a catalytically active coating that is arranged on the channel walls in at least some areas and is exposed to the gas, wherein the coating on the channel walls begins with an axial offset in the direction of flow at the admission end of some channels.

7. The reformer according to claim 6, wherein a plurality of channels are combined to form channel elements.

8. The reformer according to claim 7, wherein the channels that are combined into one channel element have a coating that begins at the same axial position.

9. The reformer according to claim 7, wherein neighboring channel elements each have a different alternating axial position at which the coating begins, as seen in the direction of flow.

10. The reformer according to claim 6, wherein the channel walls comprise silicon carbide (SiC).

* * * * *